(12) United States Patent
Mogi et al.

(10) Patent No.: US 11,652,216 B2
(45) Date of Patent: May 16, 2023

(54) ELECTRODE CATALYST LAYER FOR FUEL CELLS AND SOLID POLYMER FUEL CELL USING SAME

(71) Applicant: MITSUI MINING & SMELTING CO., LTD., Tokyo (JP)

(72) Inventors: Satoshi Mogi, Ageo (JP); Hiromu Watanabe, Ageo (JP); Ryoma Tsukuda, Ageo (JP); Naohiko Abe, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 72 days.

(21) Appl. No.: 17/260,797

(22) PCT Filed: Jun. 4, 2019

(86) PCT No.: PCT/JP2019/022072
§ 371 (c)(1),
(2) Date: Jan. 15, 2021

(87) PCT Pub. No.: WO2020/031479
PCT Pub. Date: Feb. 13, 2020

(65) Prior Publication Data
US 2021/0273239 A1 Sep. 2, 2021

(30) Foreign Application Priority Data
Aug. 9, 2018 (JP) .............................. JP2018-150646

(51) Int. Cl.
| | | |
|---|---|---|
| *H01M 4/92* | (2006.01) | |
| *H01M 4/90* | (2006.01) | |
| *H01M 8/1004* | (2016.01) | |
| *H01M 8/1018* | (2016.01) | |

(52) U.S. Cl.
CPC ........... *H01M 4/92* (2013.01); *H01M 4/9016* (2013.01); *H01M 8/1004* (2013.01); *H01M 8/1018* (2013.01)

(58) Field of Classification Search
CPC .... H01M 4/92; H01M 4/9016; H01M 8/1004; H01M 8/1018; H01M 2004/8689; H01M 4/8621; H01M 4/8673; H01M 4/921; H01M 4/925; H01M 2008/1095; H01M 8/1007; H01M 4/9075; Y02E 60/50
See application file for complete search history.

(56) References Cited

U.S. PATENT DOCUMENTS

| | | |
|---|---|---|
| 2011/0143256 A1 | 6/2011 | Thompson et al. |
| 2011/0143526 A1 | 6/2011 | Sadohara |
| 2017/0141407 A1 | 5/2017 | Taniguchi et al. |
| 2020/0321622 A1 | 10/2020 | Sharman et al. |

FOREIGN PATENT DOCUMENTS

| | | |
|---|---|---|
| EP | 1 655 795 A1 | 5/2006 |
| JP | 2002-216777 | 8/2002 |
| JP | 2005-174835 | 6/2005 |
| JP | 2008-027847 A | 2/2008 |
| JP | 2009-070584 | 4/2009 |
| JP | 2009-099486 A | 5/2009 |
| JP | 2014-160671 | 9/2014 |
| WO | 2016/063922 | 4/2016 |
| WO | 2017/203257 A1 | 11/2017 |
| WO | 2017/208761 | 12/2017 |

OTHER PUBLICATIONS

International Search Report for PCT/JP2019/022072 dated Sep. 10, 2019, 2 pages.
Written Opinion of the ISA for PCT/JP2019/022072 dated Sep. 10, 2019, 4 pages.

*Primary Examiner* — Helen Oi K Conley
(74) *Attorney, Agent, or Firm* — Nixon & Vanderhye

(57) ABSTRACT

An electrode catalyst layer for fuel cells capable of effectively preventing reduction of cell voltage in a high current density region. The electrode catalyst layer contains a catalyst-on-support composed of a support made of a conductive inorganic oxide having a catalyst supported thereon and a hydrophilic material. The hydrophilic material is an agglomerate including hydrophilic conductive particles. The content of the hydrophilic material in the catalyst layer is 2 mass % or higher and lower than 20 mass % relative to the sum of the support and the hydrophilic material. The ratio of the particle size d1 of the hydrophilic particles to the particle size D of the catalyst-on-support is 0.5 to 3.0. The ratio of the particle size d2 of the hydrophilic material to the thickness T of the catalyst layer is 0.1 to 1.2.

9 Claims, No Drawings

ELECTRODE CATALYST LAYER FOR FUEL CELLS AND SOLID POLYMER FUEL CELL USING SAME

This application is the U.S. national phase of International Application No. PCT/JP2019/022072 filed Jun. 4, 2019 which designated the U.S. and claims priority to JP Patent Application No. 2018-150646 filed Aug. 9, 2018, the entire contents of each of which are hereby incorporated by reference.

TECHNICAL FIELD

The Present invention relates to an electrode catalyst layer for fuel cells and a polymer electrolyte fuel cell using the same.

BACKGROUND ART

A polymer electrolyte fuel cell includes a polymer electrolyte membrane, a catalyst layer on either side of the electrolyte membrane, and a gas diffusion layer on the outer side of each catalyst layer. The catalyst layer is generally a porous catalyst-on-support layer composed of support particles having a noble metal catalyst supported thereon. A fuel gas such as hydrogen or methanol or an oxidizing gas such as oxygen or air diffuses through this porous catalyst layer, where an electrode reaction takes place at the three-phase interface. As a result of the electrode reaction, water is produced within the catalyst layer.

The product water dissipates from the catalyst layer. In some situations, however, liquid water accumulates in the catalyst layer, and water flooding can occur when the amount of accumulated water exceeds the water holding capacity of the catalyst layer. In particular, fuel cells containing a conductive metal oxide as a catalyst support are prone to flooding because the surface of the metal oxide is relatively hydrophilic. Flooding is considered to be a cause of cell voltage reduction.

With a view to preventing a catalyst-on-support from being wetted by water, patent literature 1 listed below discloses a powder composed of an inorganic material, such as a metal oxide, as a catalyst support having adsorbed thereon a water-repellant surface protective agent and further supported thereon a catalyst component. Patent literature 2 proposes using a catalyst layer containing a catalyst-on-support composed of a catalyst supported on an inorganic oxide support and a highly hydrophobic substance that is more hydrophobic than the inorganic oxide.

CITATION LIST

Patent Literature

Patent literature 1: JP 2009-099486A
Patent literature 2: US 2017/141407A1

SUMMARY OF INVENTION

Even when a hydrophobic material is employed as disclosed in patent literatures 1 and 2, flooding can still occur. Particularly when the fuel cell is operated at a high current density, a large amount of water is produced, and difficulties are sometimes met with in securing sufficient drainage paths in the catalyst layer for liquid water removal.

An object of the present invention is to provide an electrode catalyst layer for fuel cells that is capable of preventing occurrence of flooding thereby to effectively prevent cell voltage reduction.

The present invention provides an electrode catalyst layer for fuel cells which contains a catalyst-on-support composed of a support made of an electroconductive inorganic oxide having a catalyst supported thereon and a hydrophilic material. The hydrophilic material is an agglomerate including hydrophilic electroconductive particles. The content of the hydrophilic material in the catalyst layer is 2 mass % or higher and lower than 20 mass % relative to the sum of the support and the hydrophilic material. The ratio of the particle size d1 of the hydrophilic particles to the particle size D of the catalyst-on-support is 0.5 to 3.0. The ratio of the particle size d2 of the hydrophilic material to the thickness T of the catalyst layer is 0.1 to 1.2.

DESCRIPTION OF EMBODIMENTS

The electrode catalyst layer for fuel cells according to the present invention contains a catalyst-on-support, which is a support having a catalyst supported thereon. The support comprises inorganic oxide particles. The inorganic oxide may be a metal, non-metal, or half-metal oxide. The inorganic oxide is preferably electroconductive in terms of enhancement of catalyst layer conductivity. The inorganic oxide preferably has a volume resistivity, e.g., of not more than 100 kΩcm. Volume resistivity can be measured using, for example, a powder resistivity measuring system PD-51 and a resistivity meter MCP-T610 both available from Mitsubishi Chemical Analytec Co., Ltd. Specifically, one gram of a sample powder is put in a probe cylinder, and the probe unit is set on PD-51. A load of 57.3 MPa is applied to the sample using a hydraulic jack to make a 20 mm diameter cylindrical pellet. The resistivity of the pellet is measured with MCP-T610.

Examples of the inorganic oxide include at least one of indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides, and rhenium-based oxides. Preferred of them is tin oxide doped with at least one element selected from indium, niobium, tantalum, antimony, and tungsten. Fluorine-doped tin oxide is also preferred. Such tin-based oxides are exemplified by metal- to non-metal-doped tin oxides, such as indium-doped tin oxide, antimony-doped tin oxide, fluorine-doped tin oxide, fluorine- and tungsten-doped tin oxide, tantalum-doped tin oxide, tantalum- and antimony-doped tin oxide, tungsten-doped tin oxide, and niobium-doped tin oxide.

The particle size of the inorganic oxide is preferably 10 to 100 nm, more preferably 10 to 50 nm, even more preferably 20 to 50 nm, with a view to providing an increased specific surface area of the support. It is preferred that the particle size D of the catalyst-on-support (the inorganic oxide having a catalyst supported thereon) be also in the above range. The particle sizes of the inorganic oxide and the catalyst-on-support are determined by measuring the largest traverse length of 500 or more particles in an electron micrograph of a cross-section of a catalyst layer and calculating the average length. The observation is conducted at a 100,000 times magnification. Objects recognized as the smallest unit of a particle, judging from their apparent geometric form, at that magnification are chosen to be observed.

The catalyst to be supported on the inorganic compound support may be selected from those conventionally used in the art, such as platinum, alloys of platinum and other noble metals (e.g., palladium, ruthenium, rhodium, and iridium), and alloys of platinum and base metals (e.g., vanadium, chromium, cobalt, nickel, iron, and titanium). The catalyst preferably has an average particle size of 1 to 10 nm on the surface of the support in terms of efficient development of the catalyst performance. The particle size of the catalyst can be determined in the same manner as for the particle size determination of the inorganic oxide and the catalyst-on-support. The magnification of the observation is 500,000 times.

The method for applying the catalyst to the surface of the support is not particularly limited. Any method known in the art may be adopted. For example, when platinum is used as a catalyst, chloroplatinic acid hexahydrate ($H_2PtCl_6 \cdot 6H_2O$), dinitrodiammine platinum ($Pt(NH_3)_2(NO_2)_2$), and the like can be used as a platinum source. Platinum can be loaded on the support by reducing the platinum source by a known process, such as liquid phase chemical reduction, gas phase chemical reduction, impregnation-reductive pyrolysis, the colloid method, or surface-modified colloid-reductive pyrolysis. The amount of the catalyst on the support is preferably 1 to 70 mass %, more preferably 5 to 20 mass %, relative to the mass of the support. When a platinum alloy with a base metal is used as a catalyst, a dispersion containing a platinum compound (e.g., a platinum complex or salt), a base metal compound (e.g., a base metal complex or salt), and a reducing agent is heated to reduce platinum and the base metal thereby to form a platinum alloy, which is applied to the support.

The electrode catalyst layer for fuel cells according to the present invention further contains a hydrophilic material. It is only necessary for the hydrophilic material to be hydrophilic at least on its surface. Such a hydrophilic material is exemplified by an agglomerate including hydrophilic particles. The hydrophilic material comprising an agglomerate of hydrophilic particles has a large effective specific surface area, making it easier to provide drainage paths in the catalyst layer. In addition, to use an agglomerate of hydrophilic particles allows for increasing the efficiency of water removal because water is not formed inside the agglomerate.

The hydrophilic particles may have any shape as long as capable of providing an increased specific surface area and may have, for example, a spherical, polyhedral, platy, or spindle-like shape, or a mixture of these shapes.

Hydrophilicity may be assessed in terms of degree of hydrophobicity. Degree of hydrophobicity can be determined using a powder wettability tester WET101P from Rhesca Co., Ltd. as follows. A sample powder under test weighing 50 mg is added to 60 ml of water (25° C.) and stirred with a stirring blade. Methanol is added dropwise to the system being stirred while irradiating the system with a laser light of 780 nm and measuring the transmittance. The powder gets wet, sinks, and becomes suspended to reduce the transmittance. The volume concentration of methanol at the time when the transmittance decreases to 80% is taken as a degree of hydrophobicity. The hydrophilicity is judged to be higher, the lower the methanol concentration. In the present invention, the degree of hydrophobicity is preferably less than 2 vol %. The degree of hydrophobicity of inorganic oxide particles that are not surface-treated to be made hydrophobic, unlike the hydrophobilized inorganic oxide particles used in patent literature 2, is virtually 0 vol %. To have a degree of hydrophobicity of 0 vol % means that the powder under test settles down immediately after addition to water so that the degree of hydrophobicity of the powder is unmeasurable.

The hydrophilic particles making up the hydrophilic material may be, for example, inorganic oxide particles. With a view to enhancing electroconductivity of the catalyst layer, the hydrophilic particles advantageously have conductivity. For example, hydrophilic particles with a volume resistivity of not higher than 100 kΩcm are preferably used.

Examples of the inorganic oxides that form the hydrophilic particles are the same as those useful as a support, including at least one member selected from the group consisting of indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides, and rhenium-based oxides. Preferred of them is tin oxide doped with at least one element selected from indium, niobium, tantalum, antimony, and tungsten. Fluorine-doped tin oxide is also preferred. Such tin-based oxides are exemplified by metal- to non-metal-doped tin oxides, such as indium-doped tin oxide, antimony-doped tin oxide, fluorine-doped tin oxide, fluorine- and tungsten-doped tin oxide, tantalum-doped tin oxide, tantalum- and antimony-doped oxide, tungsten-doped tin oxide, and niobium-doped tin oxide. The inorganic compound that makes up the hydrophilic particles may be the same as or different from the inorganic compound that makes up the support.

The content of the hydrophilic material in the catalyst layer is preferably at least 2 mass % and less than 20 mass %, more preferably 2.5 to 18 mass %, even more preferably 2.5 to 15 mass %, relative to the sum of the support and the hydrophilic material. With the hydrophilic material content being in that range, the produced water is properly drained off so as to prevent flooding from occurring thereby to prevent reduction of cell voltage in a high current density region.

The hydrophilic particle that makes up the hydrophilic material preferably has a particle size d1 of 10 to 100 nm, more preferably 20 to 50 nm, with the view to providing a large specific surface area thereby to increase product water tolerance. The particle size of the hydrophilic particles is determined by measuring the largest traverse length of at least 500 particles in an electron micrograph of a cross-section of the catalyst layer and calculating the average length. The observation is conducted at 100,000 times magnification. Objects recognized as the smallest unit of a particle, judging from their apparent geometric form, at that magnification are chosen to be observed.

It is preferred that the particle size d1 of the hydrophilic particles not be greatly different from the particle size of the catalyst-on-support particles. Specifically, the ratio of the particle size d1 of the hydrophilic particles to the particle size D of the catalyst-on-support, d1/D, is preferably 0.5 to 3.0, more preferably 0.7 to 2.0, even more preferably 0.8 to 1.5. With the difference in particle size between the hydrophilic particles and the catalyst-on-support being so adjusted, appropriate drainage paths are created easily. In the case where the hydrophilic particles and the support having the catalyst thereon are of the same material, measurement of the particle size d1 of the hydrophilic particles is carried out in the same manner as described above by microscopic observation, and the regions in which the catalyst is distributed are extracted using an energy-dispersive X-ray spectroscope (EDX) linked with the electron microscope, whereby the hydrophilic particles are distinguished from the catalyst-on-support.

The particle size d2 of the hydrophilic material composed of an agglomerate of the hydrophilic particles is preferably decided in relation to the thickness T of the catalyst layer from the viewpoint of ease of creating appropriate drainage paths. From this viewpoint, the ratio of the particle size d2 of the hydrophilic material to the thickness T of the catalyst layer, d2/T, is preferably 0.1 to 1.2, more preferably 0.2 to 1.0, even more preferably 0.3 to 0.7.

The thickness T of the catalyst layer is determined by averaging the largest and the smallest of the thicknesses of the catalyst layer in cross-section in a field of view under an electron microscope. In the present invention, the thickness T of the catalyst layer is preferably 1 μm or greater, more preferably 1.5 μm or greater, even more preferably 2 μm or greater, with a view to preventing unstable electrical resistance in making a fuel cell and securing a volume enough to obtain satisfactory catalyst activity. The thickness T is preferably not greater than 10 μm with a view to preventing the electrical resistance of the resulting fuel cell from becoming too high and preventing increase of resistance to gas and water diffusion.

The particle size d2 of the hydrophilic material is measured as follows. A cross-section of the catalyst layer containing the hydrophilic material is observed under an electron microscope, and the hydrophilic material in the microscopic image is distinguished using an EDX linked with the electron microscope. The largest traverse lengths of at least 50 particles of the hydrophilic material randomly selected from the image are measured and averaged to give the particle size d2. The observation is conducted at a magnification of 10,000 times. Objects recognized as the smallest unit of a particle as judged from their apparent geometric form at that magnification are selected to be observed.

The hydrophilic material can be produced by various granulation techniques, such as spray drying, tumbling, fluidized bed, stirring, compression, extrusion, disintegration, and the like. Of these techniques spray drying granulation is preferred from the viewpoint of ease of forming a hydrophilic material with a pore size of about 5 to 100 nm and providing appropriate drainage paths. The granulation is preferably performed so that the resulting hydrophilic material may have a particle size d2 of 0.2 to 10 μm, more preferably 0.5 to 5 μm.

When needed, the electrode catalyst layer of the present invention may contain a material known in the art, such as a binder for binding particles or an ionomer, in addition to the substances hereinabove described. It is desirable, however, that the catalyst layer not contain a nonionic polymer.

The catalyst layer of the present invention is formed by a known method. For example, the catalyst-on-support and the hydrophilic material are formulated into an ink form, and the prepared catalyst ink is applied to at least one side of a polymer electrolyte membrane to form a catalyst layer. The catalyst ink may be prepared by, for example, mixing the catalyst-on-support and the hydrophilic material with a liquid medium, conveniently water. If necessary, a water-soluble organic solvent may be used in combination with water. Examples of useful water-soluble organic solvents include monovalent lower alcohols, such as ethanol and 2-propanol (isopropyl alcohol). The water-soluble organic solvents may be used either individually or in combination of two or more thereof. The ink preferably contains a proton conducting polymer. The proton conducting polymer is exemplified by a fluorinated polyolefin resin having sulfonic acid incorporated to the side chain thereof. The components described are mixed together using, for example, a planetary ball mill to make a desired catalyst ink.

A catalyst layer is formed on the polymer electrolyte membrane using the resulting catalyst ink. The ink may be applied directly to the polymer electrolyte membrane, or the ink may be once applied to a transfer sheet to form a catalyst layer, which is transferred to the polymer electrolyte membrane. The transfer sheet may be of polytetrafluoroethylene. The ink can be applied by, for example, spraying, spin coating, doctor blade coating, screen printing, or bar coating. The coating layer is dried by, for example, hot air drying or hot pressing, thereby to make a catalyst-coated membrane (CCM).

The polymer electrolyte membrane is preferably made of a material being chemically stable in the fuel cell internal environment and having high proton conductivity. A polymer electrolyte membrane having no electroconductivity and a low likelihood of gas cross-over is also preferred. Perfluorinated polyethylene having sulfonic acid groups bonded to the main chain is a suitable example of such a material. Other useful materials include polysulfones, polyether sulfones, polyether ether sulfones, polyether ether ketones, and sulfonated hydrocarbon polymers.

A gas diffusion layer is formed on the catalyst layer side of the CCM to make a membrane-electrode assembly (MEA) for fuel cells. The catalyst layer (cathode catalyst layer or anode catalyst layer) combined with the gas diffusion layer makes a cathode or an anode. The gas diffusion layer is preferably made of a material having electroconductivity and structurally capable of diffusing a fuel gas or an oxidizing gas to the catalyst layer. Such a material can be a porous body made mainly of a carbonaceous material. Specifically, porous carbon constituted of carbon fiber, such as carbon paper, carbon cloth, or carbon nonwoven cloth, may be used. These materials may be surface treated, such as water repellent treatment or hydrophilization treatment. A polymer electrolyte fuel cell can thus be manufactured.

EXAMPLES

The present invention will now be illustrated in greater detail with reference to Examples, but it should be understood that the present invention is not construed as being limited thereto. Unless otherwise noted, all the percentages are by mass.

Example 1

(1) Formation of Cathode Catalyst Layer
(a) Hydrophilic Material Preparation

Particulate tantalum- and antimony-doped tin oxide, hereinafter referred to as $Ta,Sb-SnO_2$, prepared by the method described in WO 2017/022499 (particle size d1: 31.5 nm) was used as hydrophilic particles. The $Ta,Sb-SnO_2$ particles were crushed in an agate mortar and then pulverized in a ball mill using yttrium-stabilized zirconia beads. In carrying out pulverization, 40 g of the particles were mixed with 700 ml of pure water and 40 g of ethanol, and the resulting slurry was used for pulverization. After the pulverization, the slurry was separated from the beads and granulated by spray drying to make a hydrophilic material having a particle size d2 of 2.0 μm. The spray drying conditions were: inlet temperature, 220° C.; outlet temperature, 60° C.; atomization pressure, 0.15 to 0.2 MPa; feed rate, 8.3 ml/min; and slurry concentration, 10 g/250 ml. The granules were fired at 700° C. for 5 hours in the atmosphere. To determine the degree of hydrophobicity by the above described method, the resulting hydrophilic material was added to water, whereupon the hydrophilic material settled down in water before addition of methanol. Accordingly, the degree of hydrophobicity of the hydrophilic material was 0 vol %.

(b) Formation of Electrode Catalyst Layer

Particulate fluorine- and tungsten-doped $SnO_2$ prepared by the method described in WO 2016/098399, hereinafter referred to as F,W—$SnO_2$, was used as a support. A platinum-nickel alloy was loaded on the support by the colloid method to prepare 20% Pt—Ni alloy on 80% support. The resulting catalyst-on-support had a particle size D of 30.0 nm.

In a container were put 1.46 g of the catalyst-on-support and 0.03 g of the hydrophilic material. Pure water, ethanol, and isopropyl alcohol (amounting to 3.06 g in total) were added thereto in that order in a mass ratio of 35:45:20. The resulting ink composition was dispersed by ultrasonication for 3 minutes. Yttrium-stabilized zirconia beads with a diameter of 10 mm were put in the container, and the ink was agitated on a planetary mixer ARE 310 (from Thinky Corp.) at 800 rpm for 20 minutes. To the ink was added 5% Nafion® (274704-100ML, from Sigma-Aldrich) in an amount resulting in a Nafion to (support plus hydrophilic material) mass ratio of 0.074, and the mixture was dispersed by ultrasonication and agitated on a planetary mixer under the same conditions as above.

The prepared ink was applied to a polytetrafluoroethylene sheet using a bar coater and dried at 60° C. The thus formed catalyst layer had a thickness T of 5.4 μm. The ratio of the particle size d1 of the hydrophilic particles to the particle size D of the catalyst-on-support was 1.05. The ratio of the particle size d2 of the hydrophilic material to the thickness T of the catalyst layer was 0.37.

(2) Formation of Anode Catalyst Layer

In a container was put 1.00 g of carbon black having platinum supported thereon (TEC10E50E, from Tanaka Precious Metals). Pure water, ethanol, and isopropyl alcohol (amounting to 12.8 g in total) were added thereto in that order in a mass ratio of 45:35:20 to prepare a catalyst ink. The ink was dispersed by ultrasonication for 3 minutes. Yttrium-stabilized zirconia beads with a diameter of 10 mm were put in the container, and the ink was agitated on a planetary mixer ARE 310 (from Thinky Corp.) at 800 rpm for 20 minutes. To the ink was added 5% Nafion® (274704-100ML, from Sigma-Aldrich) in an amount resulting in a Nafion to carbon black mass ratio of 0.70, and the mixture was dispersed by ultrasonication and agitated on a planetary mixer under the same conditions as above. The thus prepared catalyst ink was applied to a polytetrafluoroethylene sheet using a bar coater and dried at 60° C.

(3) Making of CCM

Each of the polytetrafluoroethylene sheets having the cathode or anode catalyst layer was cut into a 54-mm square. The cut sheets were superposed on an electrolyte membrane made of Nafion® (NRE-212, from Du Pont) one on each side and hot pressed at 140° C. and 25 kgf/cm² in the atmosphere for 2 minutes to transfer the catalyst layers. Thus, a cathode and an anode catalyst layer were formed on the opposite sides of the polymer electrolyte membrane of Nafion.

(4) Assembling of Fuel Cell

A fuel cell was assembled using the CCM obtained in (3) above. SIGRACET® 29BC, from SGL Carbon AG, was used as a gas diffusion layer.

Example 2

A fuel cell was made in the same manner as in Example 1, except for using 1.43 g of the catalyst-on-support and 0.06 g of the hydrophilic material.

Example 3

A fuel cell was made in the same manner as in Example 1, except for using 1.35 g of the catalyst-on-support and 0.12 g of the hydrophilic material.

Comparative Example 1

A fuel cell was made in the same manner as in Example 1, except for using 1.20 g of the catalyst-on-support and not using the hydrophilic material.

Comparative Example 2

A fuel cell was made in the same manner as in Example 3, except for replacing the hydrophilic material with particulate Ta,Sb—$SnO_2$ which was a hydrophilic material having a primary particle size of 31.5 nm and not having been granulated (degree of hydrophobicity: 0 vol %).

Comparative Example 3

A fuel cell was made in the same manner as in Example 3, except for replacing the hydrophilic material with particulate $TiO_2$ which was a hydrophilic material having a primary particle size of 400 nm and not having been granulated (degree of hydrophobicity: 0 vol %).

Comparative Example 4

A fuel cell was made in the same manner as in Example 1, except for using 1.20 g of the catalyst-on-support and 0.24 g of the hydrophilic material.

Evaluation:

The fuel cells obtained in Examples 1 to 3 and Comparative Examples 1 to 4 were evaluated for power generation characteristics as follows. The anode and cathode of the fuel cell were stabilized by passing therethrough nitrogen having been heated to 80° C. and humidified to 100% RH. Thereafter, humidified hydrogen was fed to the anode, and humidified air to the cathode. The degree of humidification was 100% RH. Under these conditions, the power generation characteristics (current-voltage characteristics) were determined. From the results was calculated a cell voltage (V) at a current density of 1.5 A/cm². The results are shown in Table 1.

TABLE 1

| | Catalyst-on-Support | | | Hydrophilic Material | | | Catalyst | | | Cell |
| | Catalyst | Support | Particle Size D (nm) | Material | Content*³ in Catalyst Layer (mass %) | Particle Size d1 (nm) | Particle Size d2 (μm) | Layer Thickness T (μm) | d1/D | d2/T | Voltage @ 1.5 A/cm² (V) |
|---|---|---|---|---|---|---|---|---|---|---|---|
| Example 1 | Pt, Ni | $SnO_2$ | 30.0 | $SnO_2$ | 2.5 | 31.5 | 2.0 | 5.4 | 1.05 | 0.37 | 0.519 |
| Example 2 | Pt, Ni | $SnO_2$ | 30.0 | $SnO_2$ | 5.0 | 31.5 | 2.0 | 5.4 | 1.05 | 0.37 | 0.554 |
| Example 3 | Pt, Ni | $SnO_2$ | 30.0 | $SnO_2$ | 10.0 | 31.5 | 2.0 | 5.4 | 1.05 | 0.37 | 0.524 |
| Compara. Example 1 | Pt, Ni | $SnO_2$ | 30.0 | — | 0.0 | — | — | 5.4 | — | — | 0.503 |

TABLE 1-continued

| | Catalyst-on-Support | | | Hydrophilic Material | | | Catalyst | | | Cell |
|---|---|---|---|---|---|---|---|---|---|---|
| | Catalyst | Support | Particle Size D (nm) | Material | Content*3 in Catalyst Layer (mass %) | Particle Size d1 (nm) | Particle Size d2 (μm) | Layer Thickness T (μm) | d1/D | d2/T | Voltage @ 1.5 A/cm² (V) |
| Compara. Example 2 | Pt, Ni | SnO₂ | 30.0 | SnO₂*¹ | 10.0 | 31.5 | — | 5.4 | 1.05 | — | 0.463 |
| Compara. Example 3 | Pt, Ni | SnO₂ | 30.0 | TiO₂*² | 10.0 | 400.0 | — | 5.4 | 13.33 | — | 0.423 |
| Compara. Example 4 | Pt, Ni | SnO₂ | 30.0 | SnO₂ | 20.0 | 31.5 | 2.0 | 5.4 | 1.05 | 0.37 | 0.502 |

*1 Not granulated.
*2* Not granulated.
*3 Ratio of the hydrophilic material to the sum of the support and the hydrophilic material.

As is apparent from the results in Table 1, the fuel cells of Examples prove superior to those of Comparative Examples in prevention of reduction in cell voltage in a high current density region.

INDUSTRIAL APPLICABILITY

According to the present invention, paths for draining product water are formed in the catalyst layer, through which product water is appropriately removed out of the catalyst layer, so that water flooding is prevented. Consequently, reduction of cell voltage is effectively prevented even when a fuel cell is operated at a high current density.

The invention claimed is:

1. An electrode catalyst layer for a fuel cell, having a thickness T and comprising a catalyst-on-support having a particle size D and a hydrophilic material having a particle size d2,
   the catalyst-on-support comprising a support which comprises an electroconductive inorganic oxide and a catalyst supported on the electroconductive inorganic oxide,
   the hydrophilic material being an agglomerate comprising hydrophilic electroconductive particles, the hydrophilic electroconductive particle having a particle size d1,
   the hydrophilic material being present in an amount of 2 mass % or higher and lower than 20 mass % relative to the sum of the support and the hydrophilic material,
   the ratio of the particle size d1 to the particle size D being 0.5 to 3.0, and
   the ratio of the particle size d2 to the thickness T being 0.1 to 1.2.

2. The electrode catalyst layer according to claim 1, wherein the catalyst comprises: platinum; an alloy of platinum and a noble metal other than platinum; or an alloy of platinum and a base metal.

3. The catalyst electrode layer according to claim 1, wherein the hydrophilic particle comprises at least one of an indium-based oxide, a tin-based oxide, a titanium-based oxide, a zirconium-based oxide, a selenium-based oxide, a tungsten-based oxide, a zinc-based oxide, a vanadium-based oxide, a tantalum-based oxide, a niobium-based oxide, and a rhenium-based oxide.

4. A membrane-electrode assembly for a fuel cell, comprising a polymer electrolyte membrane and the electrode catalyst layer according to claim 1 on at least one side of the polymer electrolyte membrane.

5. A polymer electrolyte fuel cell comprising the membrane-electrode assembly according to claim 4, the electrode catalyst layer being a cathode catalyst layer.

6. The catalyst electrode layer according to claim 2, wherein the hydrophilic particle comprises at least one of an indium-based oxide, a tin-based oxide, a titanium-based oxide, a zirconium-based oxide, a selenium-based oxide, a tungsten-based oxide, a zinc-based oxide, a vanadium-based oxide, a tantalum-based oxide, a niobium-based oxide, and a rhenium-based oxide.

7. A membrane-electrode assembly for a fuel cell, comprising a polymer electrolyte membrane and the electrode catalyst layer according to claim 2 on at least one side of the polymer electrolyte membrane.

8. A membrane-electrode assembly for a fuel cell, comprising a polymer electrolyte membrane and the electrode catalyst layer according to claim 3 on at least one side of the polymer electrolyte membrane.

9. A membrane-electrode assembly for a fuel cell, comprising a polymer electrolyte membrane and the electrode catalyst layer according to claim 6 on at least one side of the polymer electrolyte membrane.

* * * * *